(12) United States Patent
Cavaille et al.

(10) Patent No.: US 7,989,110 B2
(45) Date of Patent: Aug. 2, 2011

(54) REINFORCED IONIC CONDUCTING MATERIAL, USE THEREOF IN ELECTRODES AND ELECTROLYTES

(75) Inventors: Jean-Yves Cavaille, Lyons (FR); Alain Dufresne, Gières (FR); Michel Paillet, Grenoble (FR); My Ahmed Said Azizi Samir, Meyaln (FR); Fannie Alloin, Vizille (FR); Jean-Yves Sanchez, Saint Ismier (FR)

(73) Assignee: Institut National Polytechnique de Grenoble, Grenoble (FR)

( * ) Notice: Subject to any disclaimer, the term of this patent is extended or adjusted under 35 U.S.C. 154(b) by 1283 days.

(21) Appl. No.: 10/518,638

(22) PCT Filed: Jun. 20, 2003

(86) PCT No.: PCT/FR03/01908
§ 371 (c)(1),
(2), (4) Date: Nov. 21, 2005

(87) PCT Pub. No.: WO04/001888
PCT Pub. Date: Dec. 31, 2003

(65) Prior Publication Data
US 2006/0102869 A1    May 18, 2006

(30) Foreign Application Priority Data
Jun. 21, 2002    (FR) .................................. 02 07746

(51) Int. Cl.
*H01M 6/18*    (2006.01)
*H01M 4/13*    (2010.01)
*H01M 4/92*    (2006.01)
*H01M 8/10*    (2006.01)
*H01B 1/06*    (2006.01)
*H01G 9/025*    (2006.01)
*H01L 31/02*    (2006.01)

(52) U.S. Cl. ...... 429/307; 429/314; 429/321; 429/231.8; 429/231.9; 429/483; 429/524; 252/511; 136/252; 361/502

(58) Field of Classification Search .................. 429/128, 429/111, 231.4, 217, 307, 314, 321, 231.8, 429/231.9, 524, 255, 483; 29/623.1; 361/503, 361/502; 524/832; 522/31, 59; 430/62; 252/511; 136/252
See application file for complete search history.

(56) References Cited

U.S. PATENT DOCUMENTS
3,798,032 A * 3/1974 Miller .............................. 430/62
(Continued)

FOREIGN PATENT DOCUMENTS
DE    284 475 A5    11/1990
(Continued)

OTHER PUBLICATIONS
"Crystallization and Melting Behavior of Polyethylene Oxide Copolymers", Simon, et al., Journal of Applied Physics, vol. 35, No. 1, p. 82-85, Jan. 1964.*
(Continued)

*Primary Examiner* — Jonathan Crepeau
*Assistant Examiner* — Kenneth Douyette
(74) *Attorney, Agent, or Firm* — Merchant & Gould

(57) ABSTRACT

The invention relates to a solid ionic conducting material which can be used as an electrolyte or as a component of a composite electrode. The material comprises a polymer matrix, at least one ionic species and at least one reinforcing agent. The polymer matrix is a solvating polymer optionally having a polar character, a non-solvating polymer carrying acidic ionic groups, or a mixture of a solvating or non-solvating polymer and an aprotic polar liquid. The ionic species is an ionic compound selected from salts and acids, said compound being in solution in the polymer matrix, or an anionic or cationic ionic group fixed by covalent bonding on the polymer, or a combination of the two. The reinforcing agent is a cellulosic material or a chitin.

37 Claims, 1 Drawing Sheet

U.S. PATENT DOCUMENTS

| | | | |
|---|---|---|---|
| 3,856,724 A | | 12/1974 | O'Connor et al. |
| 4,442,185 A | * | 4/1984 | Skotheim ...................... 429/111 |
| 5,281,495 A | | 1/1994 | Hirakawa et al. |
| 6,087,043 A | * | 7/2000 | Tossici et al. .............. 429/231.4 |
| 6,205,016 B1 | * | 3/2001 | Niu ............................... 361/503 |
| 6,703,497 B1 | * | 3/2004 | Ladouce et al. ................ 536/56 |
| 2002/0010261 A1 | | 1/2002 | Callahan et al. |
| 2002/0013381 A1 | * | 1/2002 | Armand et al. ................. 522/31 |
| 2002/0037945 A1 | * | 3/2002 | Nielsen ......................... 523/111 |

FOREIGN PATENT DOCUMENTS

| | | | |
|---|---|---|---|
| EP | 1 031 598 A2 | | 8/2000 |
| FR | 2 743 371 A1 | | 7/1997 |
| GB | 1160084 A | * | 3/1978 |
| WO | WO 95/23824 A1 | | 9/1995 |
| WO | WO-00/15667 | * | 3/2000 |

OTHER PUBLICATIONS

"Supplemental Lecture, Cellulose", Abedon, Stephen T., Ohio State University. Retrieved online on May 25, 2010 from http://www.mansfield.ohio-state.edu/~sabedon/biol1025. htm.*

* cited by examiner

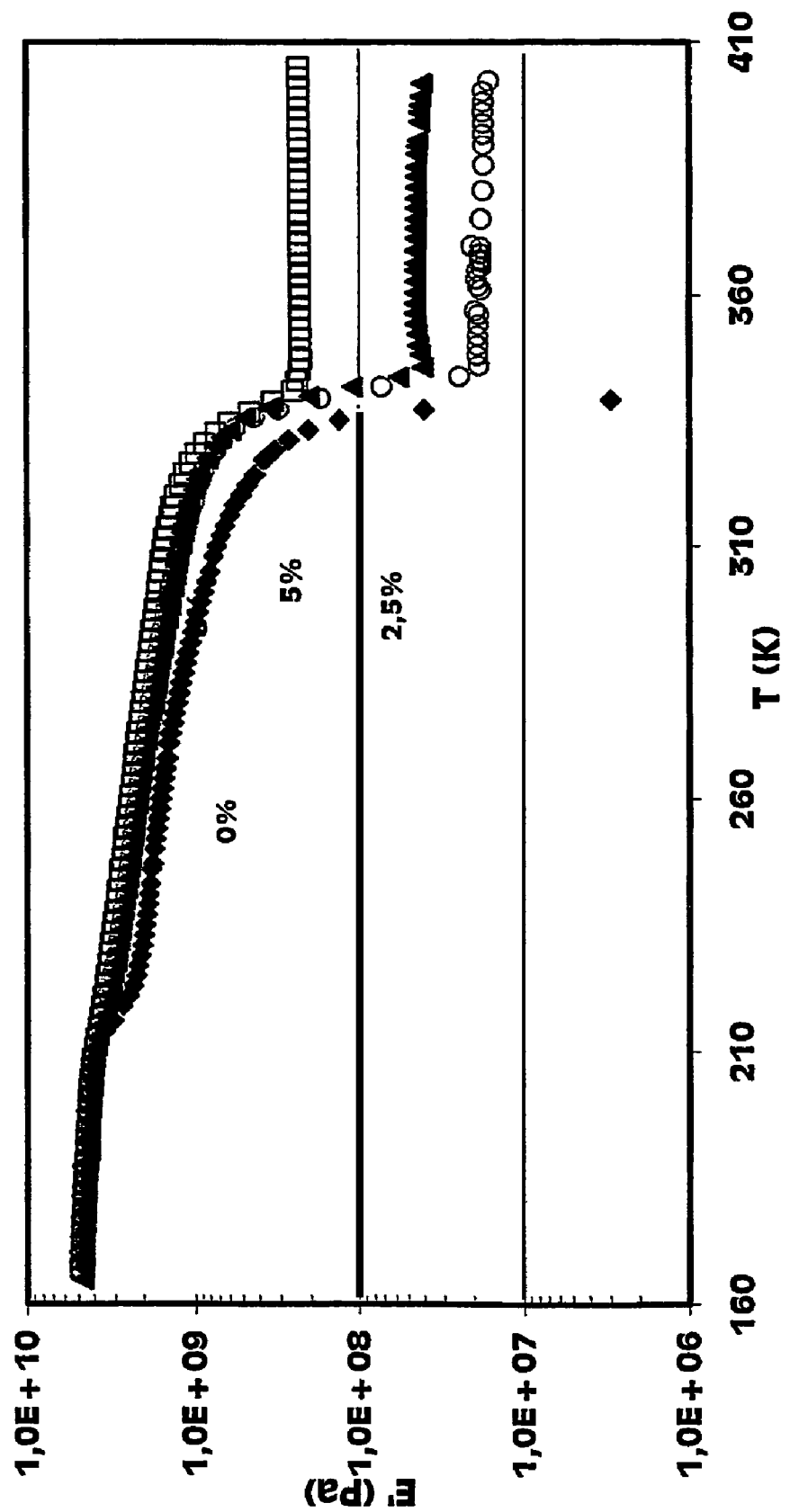

REINFORCED IONIC CONDUCTING MATERIAL, USE THEREOF IN ELECTRODES AND ELECTROLYTES

BACKGROUND OF THE INVENTION

1. Field of the Invention

The present invention relates to a solid ionic conduction material reinforced by a cellulosic material or a chitin, which can be used as an electrolyte of a battery, of a fuel cell, of a supercapacitor or of an electrochromic device, or as a component of a composite electrode.

2. Description of the Related Art

In a generator in which the electrolyte is a film of a material consisting of a readily dissociable salt dissolved in a non-plasticized polymer solvent, it is possible to reduce the internal resistance of the generator either by increasing the ionic conductivity of the polymer electrolyte or by reducing the thickness of the electrolyte film. The two aforementioned methods are in conflict because the ionic conductivity dictates the choice of functional polymer matrices which make it possible to dissolve the salt, solvate and mobilize the ions. The polymer matrices must therefore have the lowest possible degree of crystallinity in the working temperature range. However, reducing the degree of crystallinity of a polymer generally entails reducing the mechanical strength. In a polymer electrolyte, the macromolecular chains provide the mobility of the anions and cations. The mobility of the ionic species increases when the degree of crystallinity and the glass transition temperature decrease. It would therefore seem difficult to optimize the properties of a polymer electrolyte.

Various solutions have been envisaged in order to improve the mechanical strength of the polymer matrix. The degree of crystallinity of the polymer solvent has been reduced, in particular, by using comonomers other than ethylene oxide [F. Alloin et al., Electrochimica Acta, 40, 2269 (1995)]. A crosslinked polymer matrix has also been used [F. Alloin et al., J. of Electrochem. Soc., 141, 7, 1915 (1994)]. Fillers have likewise been introduced into the polymer matrix in the form of a powder or fibers (glass, carbon, aramid, alumina, silica fibers). Alumina and silica offer an improvement only when oligomers are used. Glass, carbon or aramid fibers improve the mechanical strength, but do not allow the production of thin films.

The use of cellulose in order to reinforce polymers is furthermore known.

For example, WO 95/23824 describes composite materials consisting of cellulose microfibrils dispersed in a polymer matrix. An aqueous dispersion of microfibrils is used in order to prepare a reinforced latex. The microfibrils fulfill the role of a thickener in the aqueous dispersions. These aqueous dispersions are used for paints, inks, varnishes, compositions for aqueous adhesives and ground surface coverings.

U.S. Pat. No. 5,964,983 describes the preparation of cellulose microfibrils from parenchyma (sugar beet, fruit and vegetable pulp) or wood. One of the properties mentioned for the microfibrils is their ability to form films and reinforce other materials, in particular latices or thermoplastic compounds or cellulose acetate. These microfibrils are used as a thickener for food products or for cosmetic products, as an agent improving the opacity and uniformity of paper, or as an agent improving the mechanical strength of paper.

FR 2,743,371 describes a polymer matrix reinforced by cellulose microfibrils coated with polypyrrole. Latices reinforced by dispersing the coated microfibrils in an aqueous medium are used in order to prepare composite films which are resistive or capacitive, depending on the proportion of coated cellulose microfibrils. The coated cellulose microfibrils furthermore exhibit an electronic conductivity which is inherent to polypyrrole, and this property is imparted to the composite materials which contain them.

WO 97/12917 describes the use of cellulose microfibrils as a reinforcing filler or as a structuring filler of a composite material, in particular for polymer matrices such as cellulose esters (for example cellulose acetate) and biodegradable polymers such as polyhydroxybutyrate and polyhydroxyvalerate.

EP 859 011 describes a method for obtaining cationic cellulose microfibrils, or their soluble derivatives, by reaction with a quaternary ammonium salt. The compounds obtained in this way can be used as a thickener in the field of paints, cosmetics, in the chemical industry, as a film-forming agent in papermaking, or as a flocculant in water treatment.

FR 2,784,107 describes the preparation of surface-modified cellulose microfibrils and their use as a texturing agent or reinforcing filler. The microfibrils are used in order to reinforce thermoplastic materials, thermoset materials, or crosslinked or non-crosslinked elastomers. The reinforced materials can be used for the production of a battery separator.

SUMMARY OF THE INVENTION

It is an object of the present invention to provide a material having a high ionic conductivity, which can form films with a good mechanical strength, said material being particularly advantageous for the production of the electrolyte of a battery, of a fuel cell, of a supercapacitor or of an electrochromic device, or as a component of a composite electrode.

The ionic conduction material according to the present invention comprises a polymer matrix, at least one ionic species and at least one reinforcing agent. It is characterized in that:
- the polymer matrix is a solvating, optionally having a polar character, a non-solvating polymer carrying acidic ionic groups, or a mixture of a solvating or non-solvating polymer and an aprotic polar liquid;
- the ionic species is either an ionic compound selected from salts and acids, said compound being in solution in the polymer matrix, or an anionic or cationic ionic group fixed by covalent bonding on the polymer, or a combination of the two;
- the reinforcing agent is a cellulosic material or a chitin.

BRIEF DESCRIPTION OF THE FIGURE OF THE DRAWING

FIG. 1 is a graphical representation of mechanical reinforcement observed as the modulus vs. temperature.

DETAILED DESCRIPTION OF PREFERRED EMBODIMENTS

When the reinforcing agent is a cellulosic material, it is more particularly preferable to use cellulose single crystals, generally referred to as cellulose whiskers, and cellulose microfibrils.

The proportion of reinforcing agent in the composite material is between 0.5% and 70% by weight, preferably between 1% and 10% by weight.

When the polymer matrix consists of a solvating polymer, said polymer may be selected from crosslinked and non-crosslinked solvating polymers, which optionally carry grafted ionic groups. A solvating polymer is a polymer which includes solvating units containing at least one heteroatom selected from sulfur, oxygen, nitrogen and phosphorus. The following may be mentioned as examples of solvating polymers:

- homopolymers of the polyether type, selected from poly (oxyethylenes), poly(oxypropylenes), poly(oxy-trimethylenes), poly(oxytetramethylenes) and poly-(oxymethylene)(oxyethylenes), said homopolymers having a linear structure, a comb structure, a star structure or a dendrimer structure;
- block copolymers or grafted copolymers of the polyether type, which may or may not form a network. Among these block copolymers, mention may be made of those in which some of the blocks carry functions which have redox properties and/or some of the blocks have crosslinkable groups;
- statistical, random or alternating copolymers containing recurrent oxyalkylene units, which may or may not form a network. Among the oxyalkylene units, mention may be made of the oxyethylene unit, the oxypropylene unit, the 2-chloromethyl-oxyethylene unit and the oxyethylene-oxymethylene unit, which are respectively obtained by ring opening of ethylene oxide, propylene oxide, epi-chlorohydrin and dioxolane, and which are particularly preferred. The oxyalkenyl groups which are obtained by ring opening epoxyhexene, vinyl glycidyl ether, allyl glycidyl ether, glycidyl acrylate or glycidyl methacrylate, may furthermore be mentioned;
- polyphosphazenes and polysiloxanes carrying oligoether branches;
- linear polycondensates prepared, for example, by a Williamson reaction between polyethylene glycols and dichloromethane. Such polycondensates are described in particular by J. R. Craven et al., Makromol. Chem. Rapid Comm., 1986, 7, 81;
- networks of polyethylene glycol which is crosslinked by isocyanates, or the networks obtained by preparation from polycondensates carrying crosslinkable groups, such as double or triple bonds, for example by a Williamson reaction with an unsaturated dihalide as described by F. Alloin et al., J. of Electrochem. Soc., 141, 7, 1915 (1994);
- the networks prepared by reacting polyethylene glycol modified by terminal amine functions such as the commercial products Jeffamine® and isocyanates.

The polymer matrix may consist of a non-solvating, polar or non-polar polymer carrying acidic ionic groups. Examples of the such polymers which may be mentioned are polymers which carry alkylsulfonic groups or arylsulfonic groups (for example sulfonated polysulfones or sulfonated polyether ether ketones), polymers which carry perfluorosulfonic groups (for example Nafion®) or perfluorocarboxylic groups. A polymer matrix with acidic ionic groups may be used in the hydrated state or in the form of a molar solution in a water-alcohol mixture.

The polymer matrix may furthermore consist of a mixture of a solvating or non-solvating polymer and an aprotic polar liquid. The aprotic polar liquid may be selected from linear ethers and cyclic ethers, linear acetals and cyclic acetals, linear carbonates and cyclic carbonates, esters, nitriles, nitrated derivatives, amides, sulfones, sulfolanes, alkylsulfamides and partially halogenated hydrocarbons. For example, mention may be made of diethyl ether, dimethoxyethane, glymes, tetrahydrofuran, dioxolane, dioxane, dimethyl-tetrahydrofuran, methyl or ethyl formiate, propylene or ethylene carbonate, alkyl carbonates, butyrolactones, acetonitrile, isobutyronitrile, pivalonitrile, benzo-nitrile, nitromethane, nitrobenzene, dimethyl formamide, diethyl formamide, N-methylpyrrolidone, dimethyl sulfone, tetramethylene sulfone and tetraalkyl sulfo-namides having from 5 to 10 carbon atoms, cyclic ureas. The polar liquid may be a mixture of a plurality of miscible liquid solvents. When the polymer is a solvating polymer, it is selected from those which are defined above. When the polymer is a non-solvating or weakly solvating polymer, it is preferably selected from polymers having polar groups and comprising units containing at least one heteroatom selected from sulfur, nitrogen, oxygen, phosphorus, boron, chlorine and fluorine, for example polymers which mainly contain units that are derivatives of methacrylonitrile, acrylonitrile, vinylidene fluoride, N-vinylpyrrolidone, vinyl imidazole, alkyl acrylates and methacrylates, vinyl sulfones or vinyl chloride. The proportion of aprotic polar liquid in the polymer matrix may vary in a wide range. It is preferably such that the proportion of liquid in the ionic conduction material is between 5 and 98%, preferably between 30 and 90% by weight. In this case, the concentration of salt in the liquid is between 0.2 and 5 mol/liter, preferably between 0.8 and 1.2 mol/liter.

The ionic compounds are selected from alkali metal salts, alkaline-earth metal salts, transition metal salts, rare earth salts, salts of organic or organometallic cations, as well as from inorganic or organic acids. It is preferable to use salts and acids in which the anion has a nucleophilic character as weak as possible, that is to say strong acids and their salts. For example, mention may be made of perchloric acid, phosphoric acid, perfluorosulfonic acids (in particular triflic acid), trifluorosulfonylimide acid, tris(perfluorosulfonyl)methane acid, perfluoro-carboxylic acids, arylsulfonic acids, perfluoro-sulfonimides, arylsulfonimides, and their salts.

When the ionic conduction material of the invention is intended to be used for the production of a composite electrode of a battery, it furthermore contains an electronically conductive material and an insertion material. The electronically conductive material may be carbon in the form of a fabric or powder, for example acetylene black. The electronically conductive material may be an intrinsic electronically conductive polymer such as polyacetylene, polypyrrole, polythiophene, polyparaphenylene vinylene, polyaniline, or a mixture of an intrinsic electronically conductive polymer and acetylene black. The electronically conductive material may furthermore be a polymer with hybrid conduction, that is to say ionic and electronic, used on its own or with carbon. The insertion material may furthermore be an oxide of a metal (selected for example from cobalt, nickel, manganese, vanadium and titanium) or an iron phosphate or a graphitic compound.

When the material of the invention is used for the production of a composite electrode of a fuel cell, it furthermore contains an electronic conductor (which may be of the same type as above) and an active material performing as a catalyst, for example platinum or a platinum alloy such as platinum/ruthenium.

An ionic conduction material according to the invention may furthermore contain conventional additives, for example inorganic or organic fillers such as a battery grade silica, for example.

The materials of the invention are prepared from a reinforcing agent selected from cellulosic materials and chitins, a polymer or precursors of a polymer which may or may not carry ionic groups, and optionally an ionic compound.

Cellulose microfibrils or cellulose whiskers are advantageously used for the preparation of a material reinforced by a cellulosic compound.

Cellulose whiskers can be obtained from the tunicate *Microcosmus fulcatus*, which is a Mediterranean marine animal having a total diameter of between 5 and 10 cm with a cellulose tunic of thickness 1 cm.

The cellulose microfibrils may be obtained from sugar beet pulp residues, food industry waste, by chemical and physical treatments as described by A. Dufresne et al. [Appl. Polym. Sci., 64, 1185-94, (1997)].

A chitin is a biopolymer similar to cellulose which is present in the natural state, particularly in mushrooms, yeasts, marine invertebrates and arthropods.

The composite material according to the invention may be obtained by various production methods, depending on the nature of the polymer matrix and depending on whether or not it carries ionic groups.

According to a first preparation method, the reinforcing agent is brought in contact with the polymer in solution or in the form of a latex in suspension, or with precursors of the polymer (oligomers or monomers). The reinforcing agent network is then formed in the material.

In a first variant of the first production method, a linear solvating polymer is mixed with a dispersion of reinforcing agent in water or in a water-organic solvent mixture, the water and the solvent are evaporated, and a film of polymer reinforced by a network of reinforcing agent is obtained. Among the polymers which may be used as a starting product, particular mention may be made of a linear polymer such as poly(oxyethylene) POE or poly(oxypropylene) POP, or a linear copolymer such as POE-co-PECH (polyepi-chlorohydrin) or POE-co-POP, or a linear polymer which comprises grafted ionic groups.

In a second variant of the first production method, a prepolymer in the non-crosslinked state is mixed with a dispersion of reinforcing agent in water or in a water-organic solvent mixture, the water and the solvent are evaporated, and a film of polymer reinforced by a network of reinforcing agent is obtained. The prepolymer may subsequently be crosslinked by subjecting the material to a suitable treatment. The crosslinking initiator has been added either to the initial dispersion or after removing the water and the solvent. As an example of a prepolymer, particular mention may be made of a copolymer of ethylene oxide and allyl-glycidyl ether in the non-crosslinked state.

In a third variant of the first production method, one or more monomers and a suitable initiator are introduced into a dispersion of reinforcing agent in water or in a water-organic solvent mixture, the water and the solvent are evaporated, and the material obtained is subjected to a suitable treatment in order to form a linear polymer or a three-dimensional network.

In a fourth variant, the reinforced molten polymer is processed from a lyophilizate intimately combining the polymer and the reinforcing agent.

In the four variants above,
  the salt that imparts the ionic conduction may be introduced by bringing the material obtained in contact with a small quantity of a concentrated salt solution which causes the polymer matrix to swell;
  the salt that imparts the ionic conduction may be introduced with the polymer or the polymer precursor in the form of an aqueous solution.
When the reinforcing agent being used is soluble or dispersible in an organic solvent, it may be brought in contact with the polymer or the polymer precursor in the form of a solution or a lyophilizate which furthermore contains the salt.

For example, a cellulose may be rendered soluble by treating the hydroxyl groups. This treatment of the hydroxyl groups may, for example, be a cyanoethylation with the aid of a compound carrying acrylonitrile groups, or an esterification by a carboxylic acid, or an etherification, or a silylation with the aid of chlorotrimethylsilyl.

When the polymer comprises a sufficient quantity of ionic groups, it is not essential to introduce a salt into the composite material.

In a fifth variant of the first embodiment, a non-solvating linear polar polymer is mixed with a dispersion of reinforcing agent in water or in a water-organic solvent mixture, optionally containing a salt, the water and the solvent are evaporated, and a film of polymer reinforced by a network of reinforcing agent is obtained. Among the polymers which may be used as starting products, mention may be made of homopolymers or copolymers of methacrylonitrile or vinylidene fluoride. After evaporation of the water and the optional organic solvent, and formation of a film, a polymer electrolyte is obtained which can be used in the dry state or which can be swelled by aprotic polar liquids, for example cyclic and acyclic carbonates, gamma butyrolactone and tetraethyl sulfonamide, or by a liquid electrolyte containing one or more of the aforementioned solvents and a salt.

According to a second embodiment, a network of reinforcing agent is prepared, then the polymer material is made to penetrate into said network or the polymer material is produced within the network. In this embodiment, a network of reinforcing agent is formed, then this network is impregnated with the polymer matrix produced beforehand in solid form, or with a polymer in liquid form or in solution in a solvent, or with precursor monomers in liquid form or in solution in a solvent, or with a liquid mixture of a polymer and monomers. In the different variants, the polymer and/or the polymer precursor optionally contain an ionic compound.

The network of reinforcing agent is obtained by evaporating a suspension of reinforcing agent in water, in a mixture of water and organic solvent, or in an organic solvent, the reinforcing agent being in the form of single crystals (whiskers) or microfibrils.

In the second embodiment, the cellulosic network may be impregnated with the polymer according to several variants.

According to a first variant, the impregnation is carried out by hot pressing. The matrix of polymer or prepolymer containing a salt and/or ionic groups fixed by covalent bonding is prepared in the form of a film, said film is brought in contact with a network of reinforcing agent in sheet form, and the assembly is subjected to hot pressing. If a prepolymer is being used, then a crosslinking treatment is subsequently carried out.

According to a second variant of the second embodiment, the impregnation is carried out with a polymer solution. A sheet consisting of a network of reinforcing agent is impregnated with a solution of a polymer or a polymer/salt complex, then the solvent is evaporated. Depending on whether the polymer contains a linear polymer or a prepolymer, a suitable treatment is carried out with a view to crosslinking the polymer after impregnating the sheet of reinforcing agent.

According to a third variant of the second embodiment, the impregnation is carried out with a monomer solution. A sheet consisting of a network of reinforcing agent is impregnated with a precursor monomer of the intended polymer in liquid form or in the form of a solution in a solvent, optionally in the presence of an ionic compound, then the solvent is evaporated. After impregnating the sheet of reinforcing agent, a suitable treatment is then carried out with a view to polymerizing the monomer.

In this embodiment which consists in bringing the polymer or a precursor of the polymer in contact with a sheet consisting of a network of reinforcing agent, the compositions used for the impregnation may be supplemented with a linear polymer of high mass such as POE or POP, which will lead after the post-polymerization to a (compatible or incompatible) composite mixture or to a semi-interpenetrated composite network, depending on the functionality of the starting monomers.

Irrespective of the embodiment of the method for preparing the composite materials according to the invention, one or more plasticizers or permanent solvents may be added, which will remain in the composite material. Among these constituents, mention may be made of ethylene carbonate, propylene carbonate, sulfone, tetraalkyl sulfonamides and polyethylene glycols preferably having a molar mass of less than 1000 g/mol. Among said polyethylene glycols, particular mention may be made of those whose terminal hydroxyl functions have been alkylated or esterified, for example polyethylene glycol distearate, or mono-, di- or triaminated polyethylenes such as the products marketed by Texaco under the brand name Jeffamine®.

The ionic conduction materials according to the invention can advantageously be used for the production of the electrolyte of a battery, of a fuel cell, of a supercapacitor or of an electrochromic device, or for the production of a composite electrode. Surprisingly, it has been found that the introduction of a dense fibrous reinforcement such as a cellulosic material or a chitin into a material comprising a polymer and an ionic compound which has ionic conduction properties does not cause an obstacle to the flow of the anions and cations. The reinforcement of the mechanical strength as obtained by these particular reinforcing agents is not obtained to the detriment of the ionic conduction properties. Furthermore, it has been observed that for an improvement of the mechanical strength by the same order of magnitude, the proportion of reinforcing agent according to the invention is much less than the proportion required for a conventional reinforcing agent, for example glass fibers.

When the material according to the invention is intended to be used as an electrolyte for a lithium-polymer battery in which the negative electrode consists of metallic lithium, the polymer matrix preferably consists of an amorphous one-dimensional copolymer or of an amorphous three-dimensional polyether network.

When the material according to the invention is intended to be used as an electrolyte for a lithium-ion polymer battery in which the negative electrode consists of lithiated graphite, the conductivity is provided by the liquid which swells the polymer. The polymer matrices used in this case are preferably homo- or copolymers of vinylidene fluoride, acrylonitrile, methacrylonitrile, alkyl acrylate, alkyl methacrylate or ethylene oxide. The mass swelling factors range from 85 to 90%.

A material according to the invention can be used as an electrolyte of a fuel cell. The fuel cells in question are the membrane fuel cells referred to as PEMFC (Proton Exchange Membrane Fuel Cell) which use hydrogen stored in a bottle or hydrogen obtained from methanol reforming, and the direct methanol fuel cells referred to as DMFC which use methanol in the electrolyte solution. In this application, the polymer matrix preferably consists of a non-solvating, polar or non-polar polymer carrying acidic ionic groups. Examples of such polymers which may be mentioned are polymers which carry alkylsulfonic groups or arylsulfonic groups (for example sulfonated polysulfones or sulfonated polyether ether ketones) and polymers which carry perfluorosulfonic groups (for example Nafion®).

An ionic conduction material of the present invention can be used as an electrolyte of a supercapacitor. A supercapacitor consists of an electrochemical cell comprising two electrodes separated by an electrolyte, in which the material constituting the electrodes has a very large specific surface area (for example from 100 to 1500 $m^2/g$). High electrochemical capacities are obtained during operation, due to the charging of the double layer and adsorption phenomena or surface redox reactions. The power densities obtained are very high. An ionic conduction material according to the invention in which the ionic compound is a lithium salt, a tetraalkylammonium salt, or an acidic compound is preferably selected for this particular application.

A material according to the invention can furthermore be used as an electrolyte in electrochromic glazing. Electrochromic glazing is an electrochemical cell comprising two electrodes separated by an electrolyte. One of the electrodes is a transparent electrode, and the other electrode may consist for example of a tungsten oxide $WO_3$ deposited on a film of tin oxide ITO. Under the effect of a current, the color of the $WO_3$ electrode is modulated and changes from uncolored to dark blue by insertion of protons. An ionic conduction material according to the invention in which the ionic compound is an acid, for example $H_3PO_4$, is preferably used for this particular application.

Solar cells convert light into electricity. A solar cell comprises a photoanode and a cathode separated by electrolyte, the photoanode carrying a conductive glass. An ionic conduction material according to the invention can also be used as an electrolyte in a solar cell.

The present invention will be described in more detail by the following examples, which are given by way of illustration and which do not imply any limitation.

The following products were used in the examples:

cellulose microfibrils obtained from sugar beet pulp residues coming from the sugar industry. Said residues contain about 20% to 30% cellulose in the form of long microfibrils. In order to remove the non-cellulosic part, this pulp was treated two times with 2% strength sodium hydroxide solution, then bleached two times with chlorite in order to remove the lignin. The suspension obtained was homogenized in a homogenizer of the Manton-Gaulin type. It is then stable, does not sediment and does not flocculate. A transmission electron microscopy (TEM) observation shows that the microfibrils are either individualized with diameters of from 2 to 4 nanometers or in a bundle of a few tens of elements, with lengths of several micrometers;

cellulose whiskers obtained in the form of an aqueous suspension from the tunicate *Microcosmus fulcatus* according to the following method. After chloroform anesthesia, the animal is gutted and its tunic is cut into small fragments, which are deproteinated by successive bleaching treatments according to the method of Wise et al. [Pap. Trade J., 1946, 122, 35]. The resulting tunic is then disintegrated in water, first with a Waring mixer (at a concentration of 5% by weight) and then with 15 passes through a Gaulin laboratory homogenizer operated at 400 bar (at a concentration of 1% by weight). The aqueous suspension of tunicin is mixed with sulfuric acid so as to reach a final acid/water concentration corresponding to a mass fraction of 55%. Hydrolysis is carried out at 60° C. for 20 min with strong agitation. A suspension of cellulose whiskers is obtained, which is treated using ultrasound, neutralized, then washed by dialysis;

a poly(ethylene oxide) of molar mass $M_w$=5.10$^6$ g/mol, referred to below as POE;

a polyethylene glycol of molar mass 400 mg/mol, referred to below as PEG400;

a polyethylene glycol dimethyl ether of molar mass 500 mg/mol, referred to below as PEGDME500;

a polyethylene glycol methyl methacrylate of molar mass 445 g/mol, referred to below as PEGMM445;

a lithium trifluoromethanesulfonylimide, referred to below as LiTFSI.

Example 1

In this example, POE was used in the form of an aqueous solution at 5% by weight, and the whiskers were used in the form of an aqueous suspension at 0.5% by weight.
Preparation of Films A solution of POE and a suspension of whiskers were mixed, then the POE-whisker dispersion obtained was kept away from light with magnetic agitation at 400 rpm for 24 hours. The dispersion was then degassed slowly, then poured into a Teflon® mold. The mold was then put in an oven at 40° C. for 48 hours, in order to remove the water. The film was then released from the mold and dried in a vacuum at 100° C. for 24 h.

Various tests were carried out while adjusting the volumes of POE solution and whisker suspension which were used, so as to obtain composite films containing different percentages by volume of whiskers, namely 0% (for comparison), 1%, 3%, 6%, 8%, 10%.
Measurements of Mechanical Strength The films obtained were subjected to a Dynamic Mechanical Analysis with small tensile deformations. The values obtained show that with an 8% volume fraction of whiskers the network of whiskers has been formed, because a modulus E' of 150 MPa is obtained on the rubber plate up to a temperature of 180° C., while the modulus E' is of the order of 1 MPa with the film having 0% whiskers. It thus seems that the introduction of whiskers significantly increases the mechanical properties of the films over a wide range of temperatures (T>Tg).

Mechanical measurements were also carried out in torsion on films having a 0%, 3% and 8% proportion of whiskers by volume. The mechanical reinforcement is observed up to the end-of-experiment temperature, which was 140° C., with a plateau for the modulus G' at 5.107 Pa for both films containing whiskers, while the modulus G' falls significantly at the melting temperature of POE for the pure sample with 0% whiskers. These results are represented in FIG. 1. In this FIGURE, the modulus G' is indicated on the ordinate and the temperature in K is indicated on the abscissa.
Measurements of Conductivity Conductivity measurements were carried out on two films with x % whiskers (x=0 or 8). An ionic conduction film is prepared by swelling each POE-whisker film with a small quantity of a highly concentrated solution of LiTFSI in acetonitrile. The solvent is evaporated when the film has absorbed all of the solution, and the quantity of salt introduced is determined by weighing. (In another embodiment, the salt could be incorporated by immersing the film in a concentrated salt solution, the salt concentration of the film then being directly linked with the residence time in the solution. The solvents used for this treatment are acetonitrile or dimethyl carbonate.)

Each of the two films prepared in this way was then used as an electrolyte in an electrochemical cell consisting of two stainless steel electrodes placed on either side of the film. For the film POE/8% whiskers/LiTFSI, a conductivity of 3.10-4 S/cm was obtained at 80° C. with a salt concentration corresponding to a ratio O/Li=30. With the same salt concentration and at the same temperature, the film POE/0% whiskers/LiTFSI showed a conductivity of 3.5.10$^{-4}$ S/cm, that is to say identical to within the measurement error. At 96° C., the film POE/8% whiskers/LiTFSI (O/Li=17) has a conductivity of 10$^{-3}$ S/cm.

Example 2

In this example, POE was used in the form of a solution at 5% by weight in acetonitrile, and the whiskers were used in the form of an aqueous suspension at 0.5% by weight.
Preparation of Films A solution of POE and a suspension of whiskers were mixed, then the POE-whisker dispersion obtained was kept away from light with magnetic agitation at 400 rpm for 24 hours. No flocculation of the whiskers was observed. The dispersion was then degassed slowly, then poured onto a Teflon® mold. The mold was then put in an oven at 40° C. for 48 hours, in order to remove the water and the acetonitrile. The film was then released from the mold and dried in a vacuum at 100° C. for 24 h.

Various tests were carried out while adjusting the volumes of POE solution and whisker suspension which were used, so as to obtain composite films containing different percentages by volume of whiskers, namely 0% (for comparison), 1%, 3%, 6%, 8% and 10%.
Measurements of Mechanical Strength The films obtained were subjected to a Dynamic Mechanical Analysis with small tensile deformations. The values obtained show that with an 8% volume fraction of whiskers the network of whiskers has been formed, because a modulus E' of 150 MPa is obtained on the rubber plate up to a measurement temperature of 180° C.

Example 3

This example illustrates the preparation of a POE-whisker film without solvents.

A suspension of whiskers was lyophilized in order to remove the water, and whiskers were obtained in the form of a powder. These whiskers were then mixed with POE in the molten state, that is to say at a temperature of about 80° C. The solution of whiskers in liquid POE at 80° C. was then poured into a mold. After returning to room temperature, a thin film was obtained.

The mechanical measurements obtained by Dynamic Mechanical Analysis with small tensile deformations show that with a 10% volume fraction of whiskers the network of whiskers has been formed, because a modulus E' of 50 MPa is obtained on the rubber plate.

Example 4

An aqueous solution of POE at 5% and a suspension of whiskers at 0.1% were mixed. The mixture obtained was then homogenized, and it was lyophilized until all of the water was removed. Various tests were carried out while adjusting the volumes of POE solution and whisker suspension which were used, so as to obtain composite films containing different percentages by volume of whiskers, namely 0% (for comparison), 3%, 8%, 10%.

The lyophilizate obtained was pressed at 90° C. with a pressure of 15 psi for 5 minutes in order to form a film. The mechanical measurements obtained by Dynamic Mechanical Analysis in tension give a modulus E' of 100 MPa with an 8% volume fraction of whiskers.

The advantage of this technique is that the water is removed at a low temperature. It is thus possible to operate with more dilute dispersions, which favors homogenization of the distribution of the cellulosic reinforcement in the polymer matrix.

Example 5

This example illustrates the preparation of a material by impregnating a network of cellulosic material obtained by evaporation.

An aqueous suspension of whiskers was evaporated in a vacuum for 24 hours at 50° C., then at 100° C. A film of whiskers measuring 10 microns in thickness was obtained in this way.

50-micron films of POE were also obtained by evaporating a solution of POE in acetonitrile.

The films of reinforcement and POE matrix were laminated by stacking the films in the sequence (matrix/reinforcement)$_n$/matrix. The index n indicates the number of composite films stacked. Assembly was carried out by pressing the stack at 110° C. at a pressure of 15 psi for 5 min, then holding at a temperature of 110° C. for 20 min at atmospheric pressure.

The Dynamic Mechanical Analysis with small tensile deformations shows a plateau for the modulus E' which is stable beyond the melting temperature of POE. For a film with n=2 in which the reinforcement factor is 6%, for instance, the conservation modulus E' is 600 MPa at 80° C.

Example 6

This example illustrates the preparation of an ionic conduction material.

Films of whiskers measuring 10 microns in thickness were prepared by evaporating an aqueous suspension of whiskers at 50° C., then heating to 100° C. in a vacuum for 24 hours.

Films of POE/LiTFSI measuring 50 microns in thickness were obtained by evaporating a solution of POE+LiTFSI in acetonitrile in a glove box.

The films of reinforcement and POE/LiTFSI matrix were laminated by stacking the various films in the sequence (matrix/reinforcement)$_n$/matrix. Assembly was carried by pressing the stack at 110° C. at a pressure of 15 psi for 5 min, then holding at a temperature of 110° C. for 20 min at atmospheric pressure.

The modulus E' obtained on the rubber plate is 10 MPa for a salt concentration O/Li=8 with a 0.6% fraction of whiskers, and 80 MPa with a 4% fraction of whiskers.

Example 7

The operating procedure in Example 6 was repeated, but a small quantity of PEGDME500 was added to the aqueous suspension of whiskers before forming the film of whiskers.

The conservation modulus at 80° C. of a film (matrix/reinforcement)$_2$/matrix plasticized with PEGDME500 is of the order of 80 MPa with a reinforcement factor of 4%.

Example 8

Films of whiskers measuring 10 microns in thickness were prepared by evaporating an aqueous suspension of whiskers containing PEGDME500 at 50° C., then heating to 100° C. in a vacuum for 24 hours.

A degassed solution of POE+LiTFSI in acetonitrile was poured onto a film of whiskers containing between 10% and 20% of PEGDME500 (expressed in terms of the POE). The acetonitrile was evaporated in a glove box under argon. The composite film was then dried at 60° C. in a vacuum for 24 hours.

The composite film obtained contains 24% of reinforcement and 10% of PEGDME500 for a salt concentration of O/Li=15, and has a conductivity of $4.10^{-4}$ S/cm at 80° C.

Example 9

An aqueous dispersion of POE/tetraglyme/whiskers was prepared by mixing an aqueous solution at 1.5% of POE+tetraglyme and an aqueous suspension of whiskers at 0.5%.

Various proportions of these two solutions were mixed in order to obtain a composite film containing different percentages of whiskers, namely 1%, 3%, 6%, 10%. After dispersion, the solution was degassed then slowly poured into a Teflon® mold, which was then put in an oven at 40° C. for 48 hours, in order to remove the water. The film was dried completely at 100° C. in a vacuum for 24 h.

The mechanical measurements obtained by Dynamic Mechanical Analysis with small torsion deformations give modulus G' of 15 MPa with a 6% volume fraction of whiskers and 30% of tetraglyme, and this is constant on the rubber plate up to a measurement temperature of 180° C.

Example 10

The operating procedure in Example 9 was carried out, except that the tetraglyme was replaced with PEGDME500.

A modulus E' of 27 MPa was obtained with a composite of POE+(10% PEGDME500)+8% whiskers.

Example 11

An aqueous suspension of whiskers was prepared and PEGMM445 was dissolved in it by mechanical agitation for 4 h. Acetyl acetone peroxide, which acts as a thermal crosslinking catalyst, was then added.

The dispersion obtained in this way was then degassed, then poured onto an aluminum mold. The mold was put in an oven at 40° C. for 48 h in order to evaporate the water, then polymerization was carried out at 90° C. for 24 h.

At 80° C., the conservation moduli of the PEGMM445 films obtained, reinforced by 6% whiskers, are of the order of 100 MPa on the rubber plate. A film with 6% by weight of whiskers and a ratio O/Li=12 has a conductivity of $4.10^{-4}$ and $10^{-4}$ Scm$^{-1}$ at 100° C. and 84° C. respectively.

Example 12

Films consisting of interpenetrated networks based on POE and PEGMM445 reinforced by whiskers are prepared as follows.

PEGMM445 is mixed with POE as a powder, the mixture is then dissolved in an aqueous dispersion of whiskers by mechanical agitation for 24 h. The IRGACURE® used as a photoinitiator is then added. After degassing, the dispersion is poured onto a Teflon® mold. The water is evaporated by putting the mold in an oven at 40° C. for 48 h. Polymerization is carried out by exposure to UV rays for 25 minutes at room temperature. The film obtained is then treated at 80° C. for 4 h, then 100° C. in a vacuum for 24 h.

A film of POE-PEGMM445 (⅔, ⅓) with 10% by weight of whiskers relative to the POE obtained in this way has a conductivity of $5.4.10^{-4}$ Scm$^{-1}$ and $4.10^{-4}$ Scm$^{-1}$ at 102° C. and 97° C., respectively, with a salt ratio O/Li=8.

With 33% PEGMM445 and 10% whiskers (expressed in terms of the mass of POE), the conservation modulus is of the order of 100 MPa at 80° C.

Example 13

A linear LPC400 polycondensate was prepared according to an operating procedure described by F. Alloin et al. [J. of Electrochem. Soc., 141, 7, 1915 (1994)] by a polycondensation of the Williamson type between PEG400 and 3-chloro-2-chloromethylpropene. An aqueous dispersion of LPC400—whiskers was prepared by mixing an aqueous solution at 0.17 g/ml of LPC400 and an aqueous dispersion of whiskers at 0.5%. Various proportions of these two solutions are mixed in order to obtain a composite film containing different percentages of whiskers, namely 0% (for comparison), 1%, 3%, 6%. A UV crosslinking agent IRGACURE is added at 2% relative to the number of moles of double bonds in the polycondensate. After 12 hours of magnetic agitation at 400 rpm away from light, the dispersion is degassed slowly then poured onto an aluminum mold, which is then put in an oven at 40° C. for 24 h, in order to remove the water. The film is then crosslinked by exposure to UV in argon for 10 minutes. The film is dried completely by heating to 100° C. in a vacuum for 24 hours.

The mechanical measurements obtained by Dynamic Mechanical Analysis with small tensile deformations show that without whiskers, the modulus on the rubber plate is 0.5 MPa, while with a 1% fraction by volume of whiskers a modulus E' of 2 MPa is obtained on the rubber plate, this modulus rising to 20 MPa and 100 MPa with 3% and 6% whiskers respectively.

Example 14

An aqueous dispersion of POE—microfibrils is prepared by mixing an aqueous solution at 1.5% of POE and an aqueous dispersion of microfibrils at 0.8%. Various proportions of the solutions and the dispersion are mixed in order to obtain a composite film containing different percentages of microfibrils, namely 6%, 8%, 10%, 12%. After 24 h of magnetic agitation at 400 rpm away from light, the dispersion is degassed slowly then poured onto Teflon® mold, which is then put in an oven at 40° C. for 48 h, in order to remove the water. The films are dried completely by heating to 100° C. in a vacuum for 24 h.

The mechanical measurements obtained by Dynamic Mechanical Analysis with small tensile deformations show that with an 8% fraction (by volume) of microfibrils, a modulus E' of 120 MPa is obtained on the rubber plate up to a measurement temperature of 180° C.

Example 15

An aqueous dispersion of POE-LiTFSI-microfibrils was prepared by mixing an aqueous solution at 1.5% of POE+ LiTFSI such that the salt concentration is equal to O/Li=20 (O/Li=ratio between the number of moles of oxyethylene units and the number of moles of salt) and an aqueous dispersion of microfibrils at 0.8%. Various proportions of the solution and the dispersion were mixed in order to obtain composite films containing different percentages of microfibrils, namely 6% and 10%. After 24 h of magnetic agitation at 400 rpm away from light, the dispersion was degassed slowly then poured onto Teflon® mold, which was then put in an oven at 40° C. for 48 h, in order to remove as much water as possible. The films were dried completely at 100° C. in a vacuum for 48 h.

The mechanical measurements obtained by Dynamic Mechanical Analysis with small tensile deformations show that with a 10% fraction (by volume) of microfibrils, a modulus E' of 100 MPa is obtained on the rubber plate up to the measurement temperature of 180° C.

Example 16

Films of microfibrils with a thickness of 10 μm were prepared by lyophilizing an aqueous dispersion of microfibrils at 0.8%.

50-micron films of POE were also prepared by evaporating a solution of POE in acetonitrile.

The films of reinforcement and POE matrix were laminated by stacking the films in the sequence (matrix/reinforcement)$_n$/matrix. The index n indicates the number of composite films stacked. Assembly was carried out by pressing the stack at 110° C. at a pressure of 15 psi for 5 min, then holding at a temperature of 110° C. for 20 min at atmospheric pressure.

The Dynamic Mechanical Analysis measurements with small tensile deformations show plateaus for the modulus E' which are stable beyond the melting temperature of POE. For a film with n=1 in which the reinforcement factor is 10% by volume, for instance, the conservation modulus E' is 250 MPa at 100° C.

Example 17

An aqueous dispersion of a poly(methacrylo-nitrile-co-hydroxyethyl methacrylate) copolymer was prepared by mixing a latex with 95% by mole of methacrylate of this copolymer and an aqueous dispersion of whiskers at 0.5%. Various proportions of these two constituents were mixed in order to obtain composite films containing different percentages of whiskers, namely 3%, 6%, 8%. After 24 h of magnetic agitation at 400 rpm away from light, the dispersion was degassed slowly then poured onto Teflon® mold. The mold is then treated in a controlled-humidity oven at 90° C. for 5 days, in order to remove the water. The film was dried completely by heating at 100° C. in a vacuum for 24 h.

The mechanical measurements obtained by Dynamic Mechanical Analysis with small tensile deformations show that with an 8% fraction by volume of whiskers the network of whiskers has been formed, because a modulus E' of 100 MPa is obtained, which is stable at least up to 400 K.

The composite films were swelled with a liquid electrolyte mixture of ethyl carbonate/propyl carbonate (1/1 by volume) containing 1 mol/l of LiPF$_6$. After absorption, the film contains 80% of electrolyte and 20% of copolymer. The conductivity measurements show that the value of 1 mS/cm is reached at 20° C. The mechanical measurements obtained by Dynamic Mechanical Analysis with small tensile deformations give a modulus E' of 10 MPa at 100° C.

The invention claimed is:

1. An ionic conduction material comprising a polymer matrix, at least one ionic species and at least one reinforcing agent, wherein:
the polymer matrix is a solvating polymer optionally having a polar character, non-solvating polymer carrying acidic ionic groups selected from the group consisting of alkylsulfonic groups, arylsulfonic groups, perfluorosulfonic groups, and perfluoro-carboxylic groups, or a mixture of a solvating or non-solvating polymer and an aprotic polar liquid;

the ionic species is either an ionic compound selected from salts and acids, said compound being in solution in the polymer matrix, or an anionic or cationic ionic group fixed by covalent bonding on the polymer, or a combination of the two;

the reinforcing agent is a cellulosic material comprised of cellulose single crystals or of cellulose microfibrils;

wherein a reinforcing agent network is formed in the material from the reinforcing agent being brought into contact with the polymer in solution or in the form of a latex in suspension, or with precursors of the polymer, so that the reinforcing agent network is formed in the material to improve the mechanical strength of said material.

2. The ionic conduction material as claimed in claim 1, wherein the proportion of reinforcing agent is between 0.5% and 70% by weight.

3. The ionic conduction material as claimed in claim 2, wherein the proportion of reinforcing agent is between 1% and 10% by weight.

4. The ionic conduction material as claimed in claim 1, wherein the polymer matrix is comprised of a crosslinked or non-crosslinked solvating polymer.

5. The ionic conduction material as claimed in claim 4, wherein the solvating polymer carries grafted ionic groups.

6. The ionic conduction material as claimed in claim 1, wherein the polymer matrix is comprised of a non-solvating polymer carrying acidic ionic groups.

7. The ionic conduction material as claimed in claim 1, wherein the polymer matrix is comprised of a mixture of solvating or non-solvating polymer and at least one aprotic polar liquid.

8. The ionic conduction material as claimed in claim 7, wherein the aprotic polar liquid is selected from the group consisting of linear ethers and cyclic ethers, linear acetals and cyclic acetals, linear carbonates and cyclic carbonates, esters, nitriles, nitrated derivatives, amides, sulfones, sulfolanes, alkyl-sulfamides and partially halogenated hydrocarbons.

9. The ionic conduction material as claimed in claim 7, wherein the polymer is a non-solvating polymer selected from the group consisting of polymers which have polar groups and which comprise units containing at least one heteroatom selected from sulfur, nitrogen, oxygen, phosphorus, boron, chlorine and fluorine.

10. The ionic conduction material as claimed in claim 1, wherein the ionic compound is selected from the group consisting of strong acids and from salts of alkali metals, alkaline-earth metals, transition metals, rare earths, organic cations and organometallic cations of said acids.

11. The ionic conduction material as claimed in claim 10, wherein the ionic compound is selected from the group consisting of perchloric acid, phosphoric acid, perfluoro-sulfonic acids, trifluorosulfonylimide acid, tris(perfluorosulfonyl) methane acid, perfluoro-carboxylic acids, arylsulfonic acids, perfluoro-sulfonimides and arylsulfonimides, and from salts of said acids.

12. The ionic conduction material as claimed in claim 1, further containing an electronically conductive material and an insertion material.

13. The ionic conduction material as claimed in claim 12, wherein the electronically conductive material is selected from:

carbon in the form of a fabric or powder,
intrinsic electronically conductive polymers,
mixtures of an intrinsic electronically conductive polymer and acetylene black, or
polymers with hybrid conduction, either ionic or electronic, used on their own or with carbon.

14. The ionic conduction material as claimed in claim 12, wherein the insertion material is an oxide of a metal selected from cobalt, nickel, manganese, vanadium and titanium, or an iron phosphate or a graphitic compound.

15. An electrode for a battery, comprising a composite material, wherein the composite material is a material as claimed in claim 12.

16. The ionic conduction material as claimed in claim 1, further containing an electronically conductive material and an active material performing as a catalyst.

17. The ionic conduction material as claimed in claim 16, wherein the electronically conductive material is selected from:

carbon in the form of a fabric or powder,
intrinsic electronically conductive polymers,
mixtures of an intrinsic electronically conductive polymer and acetylene black, or
polymers with hybrid conduction, either ionic or electronic, used on their own or with carbon.

18. The ionic conduction material as claimed in claim 16, wherein the active material is platinum or a platinum alloy.

19. An electrode for a fuel cell, comprising a composite material, wherein the composite material is a material as claimed in claim 16.

20. An electrolyte for a lithium-polymer battery, in which the negative electrode is comprised of metallic lithium, and a material as claimed in claim 1.

21. The electrolyte for a lithium-polymer battery as claimed in claim 20, wherein the polymer matrix of the ionic conduction material is comprised of an amorphous one-dimensional copolymer or of an amorphous three-dimensional polyether network.

22. An electrolyte for a lithium-polymer battery, in which the negative electrode consists of litigated graphite, and a material as claimed in claim 1.

23. The electrolyte for a lithium-polymer battery as claimed in claim 22, wherein the matrix of the ionic conduction polymer is comprised of a homo- or copolymer of vinylidene fluoride, acrylonitrile, methacrylonitrile, alkyl acrylate, alkyl methacrylate or ethylene oxide.

24. An electrolyte of a membrane fuel cell, comprised of an ionic conduction material as claimed in claim 1.

25. The fuel cell electrolyte as claimed in claim 24, wherein the polymer matrix is comprised of a non-solvating, polar or non-polar polymer carrying acidic ionic groups.

26. The fuel cell electrolyte as claimed in claim 24, wherein the polymer carries alkylsulfonic groups or arylsulfonic groups or perfluorosulfonic groups.

27. A solar cell comprising a photoanode and a cathode separated by electrolyte, the photoanode carrying a conductive glass, wherein the electrolyte is comprised of an ionic conduction material as claimed in claim 1.

28. A supercapacitor comprised of an electrochemical cell comprising two electrodes separated by an electrolyte, wherein the electrolyte is an ionic conduction material as claimed in claim 1 in which the ionic compound is a lithium or tetraalkylammonium salt, or an acid.

29. Electrochromic glazing comprising two electrodes separated by an electrolyte, wherein the electrolyte is an ionic conduction material as claimed in claim 1 in which the ionic compound is an acid.

30. An electrode for a battery, comprising a composite material, wherein the composite material is a material as claimed in claim 13.

31. An electrode for a battery, comprising a composite material, wherein the composite material is a material as claimed in claim 14.

32. An electrode for a fuel cell, comprising a composite material, wherein the composite material is a material as claimed in claim 17.

33. An electrode for a fuel cell, comprising a composite material, wherein the composite material is a material as claimed in claim 18.

34. The ionic conduction material as claimed in claim 1, wherein the reinforcing agent is brought into contact with the polymer in solution or in the form of a latex in suspension, or with precursors of the polymer.

35. The ionic conduction material as claimed in claim 1, wherein the cellulosic material is obtained from tunicate *Microcosmus fulcatus* or sugar beet pulp residues.

36. The ionic conduction material as claimed in claim 1, wherein the microfibrils are either individualized with diameters of from 2 to 4 nanometers or in a bundle of a few tens of elements, with lengths of several micrometers.

37. The ionic conduction material as claimed in claim 1, wherein the reinforcing agent is dispersed in water or in a water-organic solvent mixture, the water and the solvent being evaporated to form the reinforcing agent network.

* * * * *